Dec. 5, 1939.    A. C. SCHWAGER    2,182,239
AUTOMATIC RECLOSING CIRCUIT BREAKER
Filed Sept. 4, 1937    5 Sheets-Sheet 1
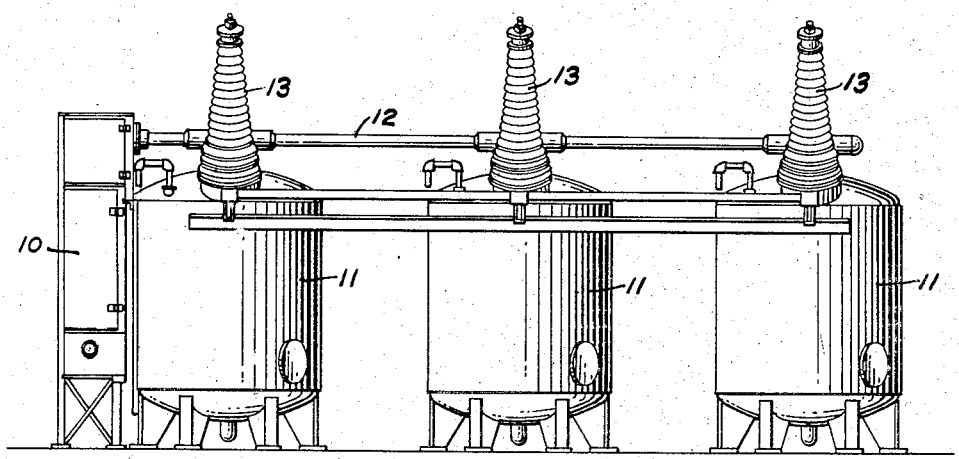
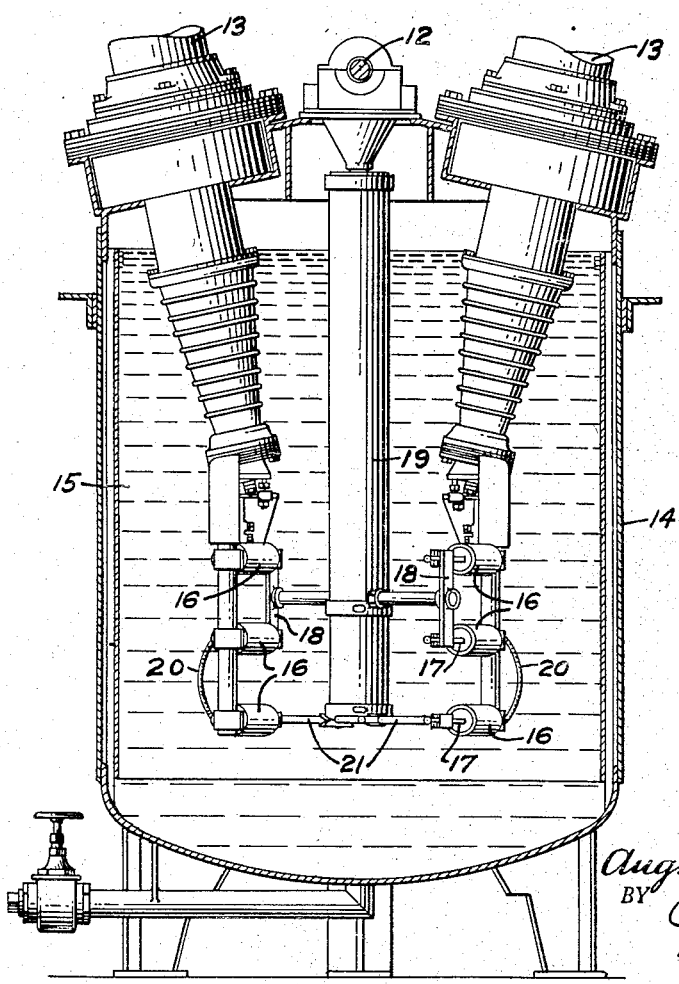
INVENTOR.
August E. Schwager
BY
ATTORNEY Dec. 5, 1939.  A. C. SCHWAGER  2,182,239
AUTOMATIC RECLOSING CIRCUIT BREAKER
Filed Sept. 4, 1937  5 Sheets-Sheet 2
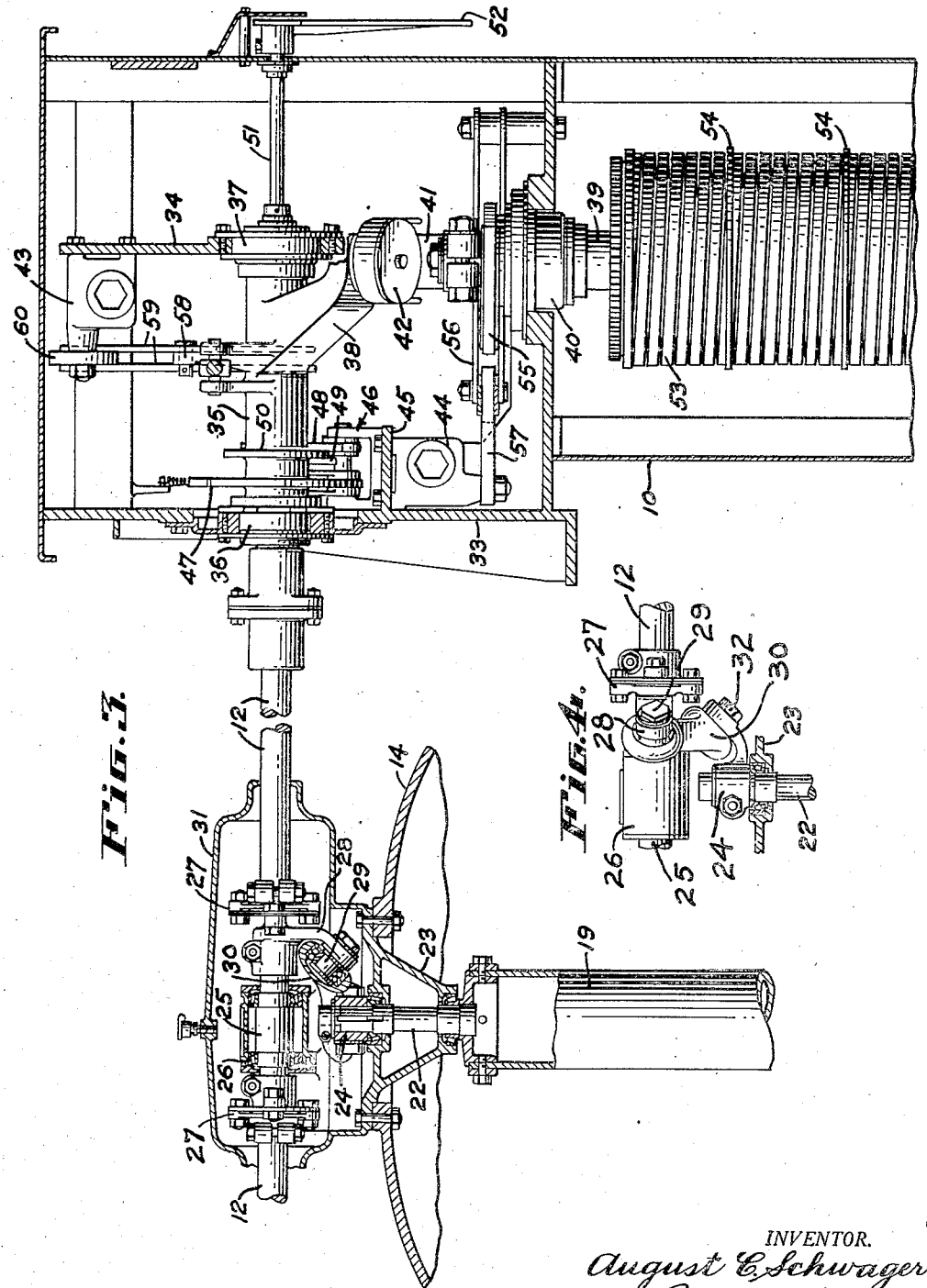
INVENTOR.
August C. Schwager
BY
ATTORNEY Dec. 5, 1939.   A. C. SCHWAGER   2,182,239
AUTOMATIC RECLOSING CIRCUIT BREAKER
Filed Sept. 4, 1937   5 Sheets-Sheet 3
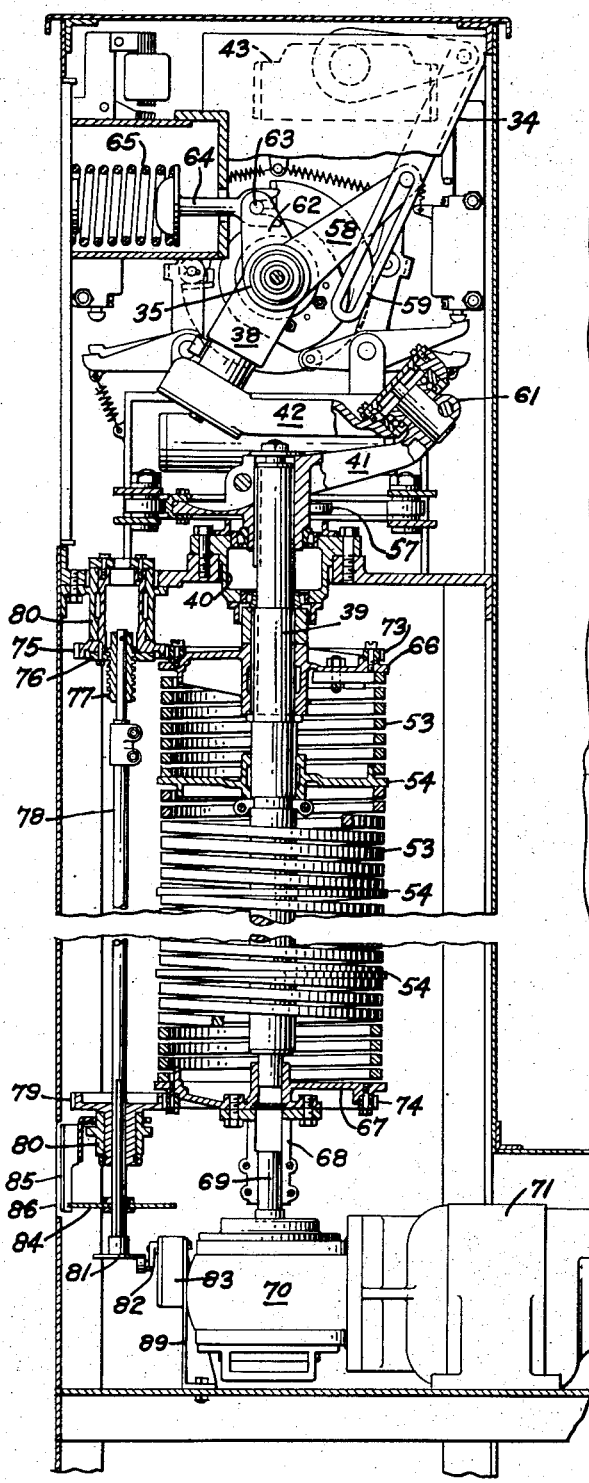
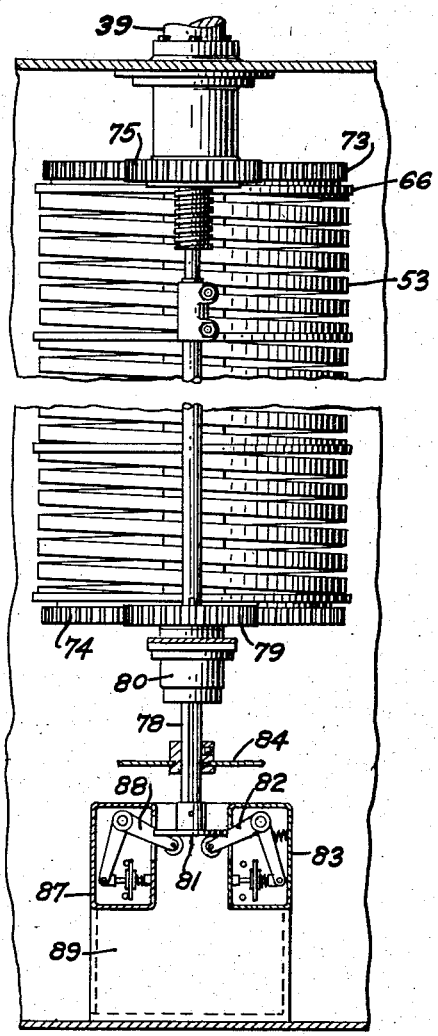
INVENTOR.
August C. Schwager
BY
W. H. Atkinson
ATTORNEY.

Dec. 5, 1939.  A. C. SCHWAGER  2,182,239
AUTOMATIC RECLOSING CIRCUIT BREAKER
Filed Sept. 4, 1937  5 Sheets-Sheet 4
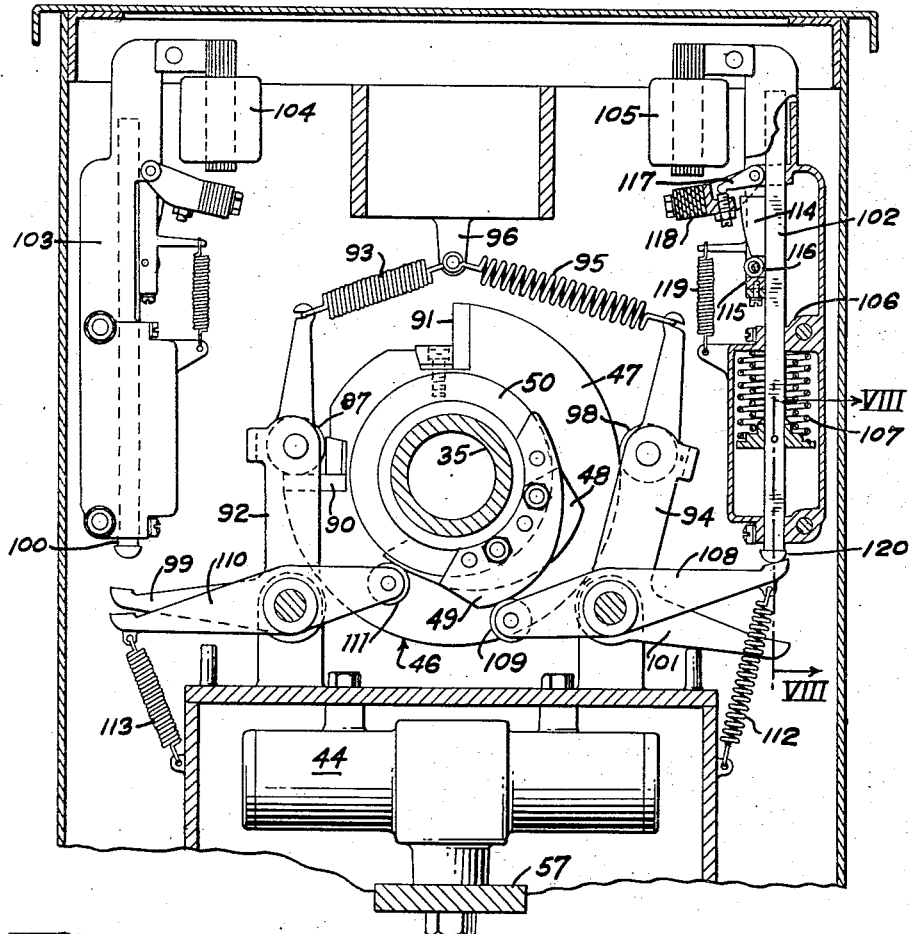
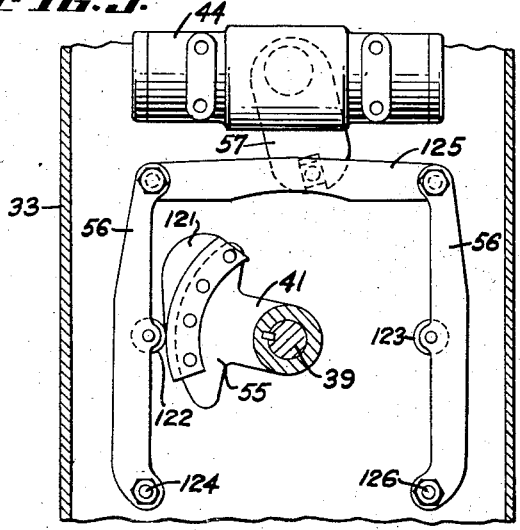
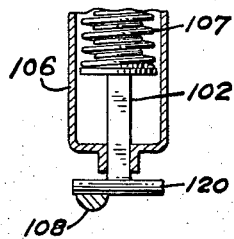
INVENTOR.
August C. Schwager
BY
Wm H. Atkinson
ATTORNEY.

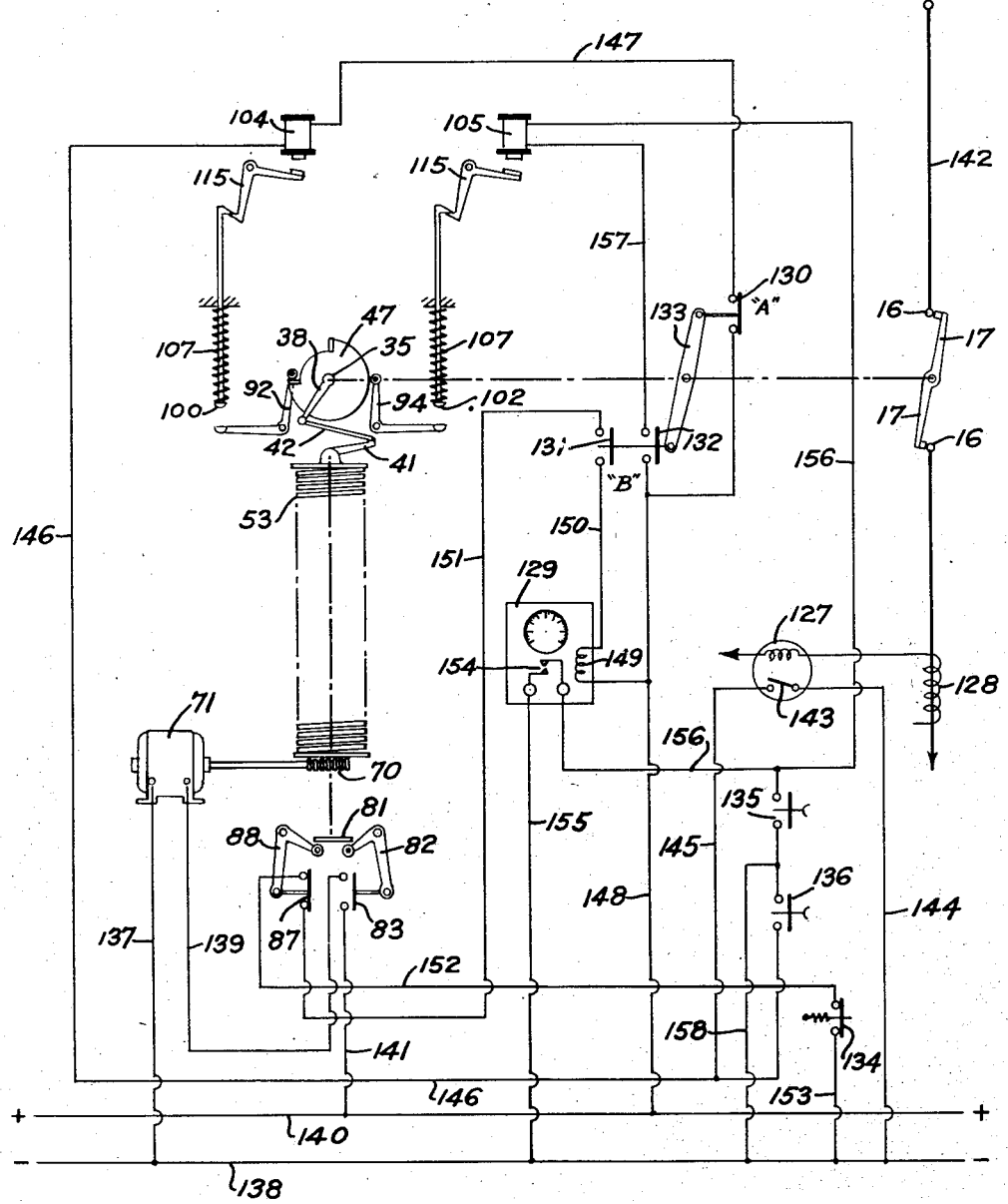

Patented Dec. 5, 1939

2,182,239

UNITED STATES PATENT OFFICE 2,182,239

AUTOMATIC RECLOSING CIRCUIT BREAKER

August C. Schwager, San Francisco, Calif., assignor to Pacific Electric Manufacturing Corporation, San Francisco, Calif., a corporation of California Application September 4, 1937, Serial No. 162,498

17 Claims. (Cl. 200—89)

The present invention relates to reclosing circuit breakers of the high tension type, such as are customarily used on high voltage transmission lines, and more particularly to a circuit breaker for this service, which is operated in an automatic manner by means of an energy storing spring or like means.

An object of the invention is to provide a new and novel actuating and controlling mechanism for a reclosing circuit breaker, in which the operation of the circuit breaker is produced by an energy storing spring.

Another object of the invention is to provide a new and novel operating mechanism for a circuit breaker, in which the circuit controlling contacts are operated by an oscillating shaft driven from a shaft that is rotatable in one direction.

Another object of the invention is to provide a new and novel form of spring operating means for a reclosing circuit breaker, in which a predetermined amount of operating energy is automatically maintained in the spring operating means by an electric motor controlled through a switch responsive to the stored energy condition of said spring operating means.

Another object of the invention is to provide a new and novel power transmitting connection between a unidirectional spring driven shaft and an oscillating circuit breaker operating shaft having dead center positions, in which an artificial loading means is used to equalize the load upon the spring driven shaft throughout a complete revolution thereof.

Another object of the invention is to provide an improved energy storing spring stop for a circuit breaker operating mechanism, having an oscillating shaft movable through an arc sufficient to open and close the contacts of the circuit breaker, wherein the energy storing spring will be compressed by the oscillating shaft at the end of its switch closing movement and release its energy to accelerate an opening of the switch during the initial switch opening movement of the oscillating shaft.

Another object of the invention is to provide a new and novel latching means for an oscillating circuit breaker operating shaft, in which the latching means is released by a spring operated striker under the control of an electromagnetic means, and in which the spring operated striker is automatically reset by the oscillating shaft after its release by the latching means.

A further object of the invention is to provide new and novel operating and controlling means for a reclosing circuit breaker, in which the circuit breaker is operated by a spring actuated mechanical driving mechanism interlocked and associated with electrical control means, so that the operation of the switch may be carried out in a safe and efficient manner under all conditions of use.

Other objects and advantages of the invention will be in part evident to those skilled in the art to which this invention appertains as the description thereof proceeds, and in part hereinafter pointed out in connection with the description of the accompanying drawings, wherein there is shown by way of illustration and not of limitation, a preferred embodiment of the invention.

In the drawings, wherein like numerals refer to like parts throughout the several views;

Figure 1 is a side elevation of a high tension circuit breaker of the isolated phase type, adapted and arranged to be operated in accordance with the present invention.

Figure 2 is an enlarged sectionalized view showing the contact details of one of the circuit breakers shown in Figure 1, Figure 3 is a fragmentary view, partially in section, with parts broken away to shown certain details of construction, Figure 4 is a fragmentary view of the contact operating connection shown in Figure 3, Figure 5 is a view in elevation, with parts broken away and in section, showing other details of construction, Figure 6 is a slightly enlarged view of a portion of Figure 5, looking to the right and showing the spring winding motor control.

Figure 7 is a fragmentary view, partly in section, showing further details of construction, Figure 8 is a fragmentary sectional view taken along line VIII—VIII of Figure 7, looking in direction of arrows, Figure 9 is a fragmentary plan view, showing additional details of construction, and Figure 10 is a diagrammatic wiring diagram showing the arrangement and electrical control for the mechanically operating aspects of the invention.

Reference is now made to Figure 1 of the drawings, wherein an operating and reclosing mechanism constructed in accordance with a preferred form of the invention is shown as applied to a high voltage 3-phase circuit breaker, in which the phases of the circuit are isolated by submerging the circuit controlling contacts of each phase in an insulating oil carried by separate containers or tanks, as is well understood in the art. In this figure of the drawings the numeral 10 designates a mechanism enclosing housing, shown as disposed at one end of a line of three single phase oil circuit breakers 11. Extending from the top of the housing 10 and transversely of the oil circuit breakers 11 there is an operating shaft 12 that is connected to operate the circuit making and breaking contacts of the oil circuit breakers 11 in a manner to be hereinafter described. The oil circuit breakers 11 each have two upwardly extending insulating bushings 13 from which the circuit connections extend, and as shown, the operating shaft 12 is disposed between these bushings.

In Figure 2 of the drawings, the bushings 13 of the circuit breakers 11 are shown as extending downwardly into a tank 14, and beneath the surface of an insulating oil 15, where at their lower ends they each support stationary contacts 16 with which movable contacts 17 are adapted to cooperate, and thus provide what is termed a multiple break in the circuit. In the particular arrangement shown, the two upper movable contacts 17 are bridged by a conductor 18 carried by an insulating support 19, and the two lower stationary contacts 16 are connected together electrically by a conductor 20, and the lowermost movable contacts 17 are connected together by a conducting support 21 secured upon the lower end of the insulating support 19. The insulating support 19, as will hereinafter appear, is adapted to oscillate about a vertical axis through an arc sufficient to move the movable contacts 17 into and out of circuit establishing relation with their respective stationary contacts 16. With this arrangement it will be understood that when the movable contacts 17 of a circuit breaker 11 are in their open circuit position, the circuit between the bushings 13 will be interrupted at six points. This arrangement of contacts, however, is not necessary to a full realization of the advantages of the present invention, but is merely shown to illustrate one type of circuit breaker to which the invention is applicable. In other words, it is conceivable that the oil circuit breaker contacts may be arranged and constructed in accordance with other well known arrangements.

As shown in Figure 3 of the drawings, the insulating support 19 which carries the movable contacts 17 is mounted upon a vertically disposed shaft 22 that is journaled in a bearing support 23, the bearing support 23 being secured upon the top of the tank 14. At the upper end of the shaft 22 there is a crank arm 24 by means of which the shaft 22 is turned, as will hereinafter appear. In addition to supporting the vertical shaft 22 the bearing support 23 also serves to support a short length of shaft 25 which is interposed in and forms a part of the main switch operating shaft 12. This shaft 25 is supported on bearings 26, and at its ends it has flexible couplings 27 by means of which it is connected to the adjacent ends of the main shaft 12. Secured upon the shaft 25 there is a crank arm 28. This crank arm 28 has an angularly disposed stub shaft 29 to which one end of a universal link 30 is connected. In order to enclose the above described elements, the bearing support 23 is shown as split along the axis of the shaft 12 so as to form a cover portion 31 which may be removed for the purpose of completing the assembly.

As shown in Figure 4 of the drawings, the crank arm 24, like the crank arm 28 upon the shaft 25, has a diagonally disposed stub shaft 32 to which the other end of the universal link 30 is journaled. With this arrangement it will be readily seen that when the shaft 12 is oscillated through an angle of 90 degrees the connection formed by the crank arms 24 and 28 and the universal link 30 will cause the shaft 22 to be oscillated in a corresponding direction through a predetermined arc. This will cause the movable contacts 17 to be moved into and out of contact with the stationary contacts 16, as has been previously described in connection with Figure 2 of the drawings.

While there has been described above details of a specific type of switch and an operating connection therefor, it is to be understood that this description has been made solely for the purpose of illustrating an adaptation of the present invention to a circuit breaker of well known construction. For fuller description of the beveled link connection shown in Figures 3 and 4 of the drawings, attention is directed to United States Patent No. 1,965,272, dated July 3, 1934, to Roy Wilkins, wherein the illustrated arrangement is described and claimed.

In addition to showing the driving connection between the circuit breaker and the operating shaft 12, Figure 3 also illustrates the manner in which the operating shaft 12 is driven with an oscillating movement by the circuit breaker operating and reclosing mechanism contemplated by this invention. In this figure of the drawings it will be noted that the enclosing housing 10 has an upper cast or otherwise fabricated portion 33 that serves as a support for the various cooperating elements. Carried by the supporting portion 33 between a wall thereof and a supporting web 34 there is an oscillatable member 35. This member 35 is shown as journaled at one end in a bearing 36 carried by a wall of the support 33, and at its other end it is journaled in a bearing 37 carried by the supporting web 34. Extending radially outward from the member 35 there is an angularly disposed crank arm 38, the end of which is adapted to move in a vertical plane along the axis of a power shaft 39. The power shaft 39 is shown as journaled at its upper end in the bottom wall of the support 33 by means of a bearing 40, and at the upper end of the power shaft 39, inside the support 33, there is a radially extending crank arm 41 which is connected at its free end by means of a floating or universal link 42 with the free end of the crank 38 upon the member 35. Cooperating with the rotatable member 35, as will hereinafter appear, there is a fluid pressure check or shock absorbing means 43, and cooperating with the power shaft 39, as will also hereinafter appear, there is a second check or shock absorbing means 44. The shock absorbing means 43 is shown as mounted upon the supporting web 34 above the rotatable member 35, and the shock absorbing means 44 is shown as mounted upon a shelf 45 carried by the wall of the support 33. In this figure of the drawings, the shelf 45 is shown as also supporting a latching mechanism, designated generally by the numeral 46, which is adapted to cooperate with a latching disc 47 and latch resetting cams 48 and 49 that are carried by an annular flange 50 upon the rotatable member 35. To indicate the position of the rotatable member 35, and thus the condition of the circuit breaker contacts, there extends from the end of the rotatable member 35 a light shaft 51 upon the end of which there is secured an indicating pointer 52. Disposed below the support 33 concentrically about the power shaft 39 and secured to the upper end of this shaft there is a helical energy storing spring 53. As here shown, the spring 53, because of its relatively large diameter and the inability to obtain on the market a continuous length of steel sufficient to form the same, is shown as comprising a plurality of sections that are secured together by annular plates 54 to which the adjacent ends of the spring sections are firmly secured. In operation the spring 53, when wound, is adapted to exert a continuous driving force upon the power shaft 39 so as to cause it to rotate counter-clockwise when viewed from the top thereof. Since there are two positions during a revolution of the power shaft 39, when the universal link 42 and the crank arms 38 and 41 reach what may be termed a dead center, resort is had to a loading means for a power shaft 39, which will serve to provide a substantially uniform load upon this shaft during a complete revolution thereof. This loading means, as will be described hereinafter in more detail, comprises a cam disk 55 which cooperates with a snubbing roller, not shown in this figure of the drawings, that is carried by links 56 attached to an arm 57 of the fluid check or shock absorbing means 44. In addition to the loading means just described as operating upon the power shaft 39, resort is also had to the shock absorbing means 43 which, as shown, is connected to a radially extending arm 58 upon the rotatable member 35 through a slotted link connection 59 carried by an arm 60 of the shock absorbing means 43.

Reference is now made to Figure 5 of the drawings for a further description of the above referred to elements. In this figure of the drawings, as in Figure 3, the parts are shown in the positions which they normally assume when the circuit breaker is latched in its closed circuit position. Under these conditions the crank arm 41 will extend to the right when viewed from the end of the rotatable member 35, and the floating or universal link 42 will be disposed substantially horizontal, while the crank arm 38 upon the rotatable member 35 will extend downwardly at about a 45 degree angle. In connection with this figure of the drawings it will be noted that the floating link 42 is journaled upon stub shafts carried by the cranks 38 and 41, which have their axes located along radially extending lines that intersect at the axis of the rotatable member 35. One of these stub shaft connections, designated by the numeral 61, is illustrated in section at the end of the crank arm 41. When the rotatable member 35 is in the position shown, the end of its radially extending arm 58 will assume its uppermost position with respect to the slotted links 59, where in approaching this position the shock absorbing device 43 will come into operation. In addition to the arm 58 the rotatable member 35 also carries a pair of spaced arms 62 between which there extends an abutment engaging pin 63. This pin 63 is adapted when the apparatus is in the position shown, to engage a spring stop forming member 64 disposed in its path, the member 64 being biased outwardly by means of a compression spring 65. This compression spring 65 and its stop member 64, in addition to serving as a shock absorbing means when the parts move into the positions shown, also serve, while the crank arms 38 and 41, and the universal link 42 are on a dead center, to impart an initial switch opening force upon the rotatable member 35, which will insure a quick response immediately upon a release of the latter member by the latching mechanism 46, which is to be described in more detail hereinafter in connection with Figure 7 of the drawings.

From a further inspection of Figure 5 of the drawings it will be seen that the upper end of the energy storing spring 53 is carried by an end plate 66 that is keyed upon the power shaft 39. At the lower end of the power shaft 39, and journaled for relative movement thereupon so as to center the power shaft at this end, there is a lower end plate 67 to which the other end of the energy storing spring 53 is secured. The lower end plate 67 is supported upon a split bracket 68 which is clamped upon a vertical shaft 69 that extends upwardly out of a reduction gearing 70 connected in driving relation with an electric motor 71. In this manner the lower end of the power shaft 39 is centered with respect to the reduction gearing shaft 69, and when the latter shaft is turned by the motor 71 through the reduction gearing 70, the spring 53 will be wound up so as to store energy therein. When the spring 53 is thus wound by the motor 71 the annular plates 54, which are rotatably mounted upon the power shaft 39, will turn readily and adjust themselves axially upon the shaft 39 so that the several sections of the spring 53 will function as a continuous helical unit. Under some conditions of operation, as during assembly or testing, it may be desirable to wind the spring 53 by hand, and for this purpose the motor 71 is provided with a crank shaft 72 by means of which the motor and the reduction gear 70 between it and the shaft 69 may be manually turned.

For the purpose of automatically winding and maintaining a predetermined amount of stored energy in the spring 53, there is provided a differentially operating mechanism that is responsive to the relative angular displacement of the end plates 66 and 67 at the ends of the spring 53. This automatic winding of the spring 53 is accomplished, in accordance with a preferred form of the invention, by locating a ring gear 73 upon the top plate 66 of the spring 53 and securing a similar ring gear 74 upon the bottom end plate 67. The upper ring gear 73 rotates a smaller gear 75 having a hollow core, at the lower end of which there is a threaded nut 76 into which a vertically disposed screw-threaded member 77 extends. The screw-threaded member 77 is secured upon the end of a vertically movable shaft 78 that is spline-connected so as to slide freely through a lower gear 79 which is adapted to be driven by the lower ring gear 74. The lower gear 79 is held against axial displacement by a bearing member 80, and when this latter gear is turned, as is the case during a winding of the spring by the motor 71, the shaft 78 will be moved downwardly by a turning of the screw-threaded portion 77 in the threaded nut 76 upon the gear 75. The latter gear remains stationary under these conditions. This downward movement of the shaft 78 will cause a switch operating disc 81 at its lower end to move downwardly and engage a crank 82 of a motor control switch 83 to open the motor circuit, and thus stop the winding of the spring 53 when the shaft 78 has reached a predetermined lowered position. As shown, the shaft 78 is in the position it assumes when the spring 53 is wound. With this arrangement it will also be seen that when the upper end plate 66 rotates, as when the operating mechanism functions to take energy from the spring 53, the gear 75 will be turned by the upper ring gear 66 so as to carry the threaded nut 76 around the screw-threaded member 77, and thus cause the shaft 78 to be raised upwardly so that the disc 81 will permit the crank arm 82 to move upwardly in response to a biasing spring, and thus close the motor control switch 83. When this occurs the spring winding motor 71 will operate until the lower end of the spring 53 has been turned a sufficient distance to again lower the shaft 78 until the disc 81 opens the motor circuit control switch 82.

As a means to provide a visual indication as to the wound condition of the spring 53, the vertically movable shaft 78 carries an indicating disc 84 that cooperates with a graduated scale 85 arranged adjacent the edge thereof. The graduated scale 85 is disposed in an opening 86 at the lower part of the housing 10, and it has a vertical slot through which the edge of the disc 84 is visible. Adjacent the slot in the graduated scale 85 there may be provided any suitable markings, such as "Wound" and "Unwound", or this graduated scale 85 may carry numerals 1, 2, 3, 4, etc., which will be indicative of the number of times the spring 53 is capable of reclosing the circuit breaker at the particularly indicated condition of the spring 53.

Reference is now made to Figure 6 of the drawings, wherein the spring 53 is shown on a somewhat enlarged scale. In this figure of the drawings the motor control switch 83 is shown as disposed at one side of the vertically movable shaft 78, and at the other side of this shaft there is a similar switch 87 which, however, operates in a reverse manner. That is to say, this latter switch 87 will be closed when the spring 53 is fully wound and will be open when the energy stored in the spring 53 is insufficient to provide at least one reclosing and a final opening of the circuit breaker. The switch 87 is operated by an arm 88 that engages with the disc 81 and is shown as mounted upon a support 89 which also carries the motor control switch 83. A further description of the switches 83 and 87, and particularly their functions with respect to the ultimate control effected thereby, will be pointed out in more detail hereinafter in connection with Figure 10 of the drawings.

Reference is now made to Figure 7 of the drawings for a detailed description of the latching mechanism previously designated generally by the numeral 46. As here shown, the latch disc 47 is provided with two opposed latch abutments 90 and 91, which correspond respectively to the closed and open circuit positions of the circuit breaker. Associated with the abutment 90 there is a pivotally mounted latch 92 which is biased into engagement with the abutment 90 by means of a spring 93, and associated with the abutment 91 there is a similar latch 94 that is biased into its latching position by means of a spring 95. The springs 93 and 95 are secured upon a common fixed support 96 carried by the supporting frame 33. The latches 92 and 94 are bifurcated in character, and at their abutment engaging ends they carry rollers 97 and 98 respectively. The latch 92 has an outwardly extending arm 99 against which a spring actuated plunger 100 is adapted to strike, as will hereinafter appear, and the latch 94 has a similar outwardly extending arm 101 against which a spring actuated plunger 102 is adapted to strike. The spring actuated plunger 100 is shown as mounted upon a support 103 and is adapted to be controlled by an electromagnet 104 in a manner similar to that in which a like electromagnet 105 serves to control the release of the spring actuated plunger 102. The spring actuated plunger 102 is shown as slidably mounted upon a support 106. The mechanism that supports and controls the spring pressed plungers 100 and 102 are identical in form and mode of operation, except that they are arranged as right and left-hand devices. Therefore a detailed description of the mechanism associated with the spring pressed plunger 102 will suffice as a description for both of these devices. As shown, the spring pressed plunger 102 is biased downwardly by a spring means 107, which is arranged to be compressed when the plunger 102 is raised by a reset lever 108 into the position shown. The lever 108 carries a roller 109 that cooperates with the reset cam 49 secured upon the annular flange 50 of the rotatable member 35. A similar lever 110 having a roller 111 which cooperates with the cam 48 upon the annular flange 50 is also provided for resetting the spring pressed plunger 100. The reset levers 108 and 110 are shown as respectively held into cooperating engagement with their cams 48 and 49 by means of tension springs 112 and 113. When the spring pressed plunger 102 is raised by its reset lever 108 an abutment 114 carried thereby will be engaged by a latching arm 115, where it will be held in the position shown. To reduce friction between the abutment 114 and the latching arm 115 the latter arm is provided with a rolling detent 116. The latching arm 115 also has an outwardly extending arm 117 that is engaged by a movable armature 118 which is responsive to the electromagnet 105 so that when this electromagnet 105 is energized, the latching arm 115 with its roller 116 will be moved to the left against the action of a retaining spring 119 to release the spring pressed plunger 102. This will permit the spring means 107 to move the plunger 102 downwardly so as to strike the outwardly extending arm 101 upon the latch 94 with considerable impact, and thus quickly disengage the roller 98 from the latching abutment 91 and permit a closing of the circuit breaker. As shown in this figure of the drawings, the spring actuated plunger 100 is in a position to release the latch 92 which is now engaged with the abutment 90 and is operating to hold the circuit breaker in its closed position.

From the above it will be seen that when the electromagnet 104 is energized, the latching mechanism will be released to permit an opening of the circuit breaker, whereas, when the electromagnet 105 is energized, the latching mechanism will be released to permit a closing of the circuit breaker. In connection with the electromagnet 105, it will be understood that when it is energized, the reset lever 108 will be in a position similar to that in which the reset lever 110 is now shown, and at the same time the outwardly extending arm 101 upon the latch 94 will be raised and located above the end of the reset lever 108, so that when the spring actuated plunger 102 is released it will engage the outwardly extending arm 101 and carry the roller 98 upon the latch 94 out of engagement with the abutment 91. This will permit the circuit breaker to close in response to the energy supplied by the spring 53.

As shown in Figure 8 of the drawings, the spring actuated plungers 100 and 102 are each provided with a transversely extending crosshead 120, which is adapted to engage the extending ends of the outwardly extending arms 99 and 101 of the latches 92 and 94, and also the adjacent outwardly extending ends of the reset levers 108 and 110.

Reference is now made to Figure 9 of the drawings for a further description of the loading means previously referred to as operating upon the driving shaft 39 to equalize the load upon the energy storing spring 53 throughout each revolution of the shaft 39. As shown in this figure of the drawings, the crank arm 41 has a radially extending arm or sector of a disc 55 upon which there is secured a cam face 121. When the shaft 39 is rotated by the energy storing spring 53 the cam face 121 will be carried around the shaft 39 in a counter-clockwise direction so that as the crank arms 38 and 41 and their connecting link 42 approach a dead center position, as previously pointed out, the cam face 121 will engage either a snubbing roller 122 or a similar roller 123, as determined by the particular position of the circuit breaker. As here shown, the cam face 121 is engaging the snubbing roller 122. At this point the crank 41 is moving into the dead center position which corresponds to the closed position of the circuit breaker, as is shown in Figure 5 of the drawings. When the cam face 121 engages the snubbing roller 122 it will be seen that the links 56, which carry this snubbing roller, will be moved outwardly about a pivotal support 124 at the lower end thereof, and because of a connection 125, which extends from the upper ends of these links 56 to the arm 57 upon the shock absorbing check 44, the rotation of the shaft 39 through this dead center position of the crank arms 38 and 41 will be retarded, due to the load imposed thereupon by the shock absorbing check 44. This will provide a substantially uniform load upon the spring 53 and will prevent any possibility of a whipping or overcenter action taking place between the crank arms 38 and 41 and their connecting link 42. When the shaft 39 has rotated 180 degrees from position illustrated in this figure of the drawings, the cam face 121 will engage the snubbing roller 123, and the same loading action will be repeated as the cranks 38 and 41 approach the second dead center which occurs when the operating mechanism reaches the circuit breaker open position. When the cam face 121 engages the snubbing roller 123, the arm 57 of the shock absorbing check 44 will be in its left-hand position, and as the snubbing roller is moved to the right by rotation of its supporting links 56 about a pivotal support 126, the arm 57 of the shock absorbing device will be moved to the right, due to the connecting member 125 which also connects with the upper ends of the links 56 that support the snubbing roller 123.

Before proceeding with a general description of the operation of the present invention, reference is made to Figure 10 of the drawings, wherein there is shown a form of control circuit for the electromagnetically actuated features that are associated with the mechanical expedients to produce a complete and automatically operating reclosing circuit breaker. In this figure of the drawings, in addition to the essential mechanical aspects of the invention, which are shown diagrammatically, there is also illustrated suitable control elements, such as an overload current relay 127 which is connected to the main circuit through a current transformer 128, and a timing relay 129 which is adjustable so as to control the lapsed time interval for the first and the subsequent reclosings of the main circuit breaker contacts. The provision of such a timing relay 129, as contemplated in accordance with the present invention, is to time the reclosing operations of the circuit breaker. For example, in the event of a sustained overload, the timing device 129 may be set to permit a first reclosing of the circuit breaker substantially instantaneously, whereas each of the subsequent reclosing of the circuit breaker may be timed to occur after the lapse of different and longer periods of time. In addition to the overload relay 127 and the timing device 129, there is also provided an "A" switch 130 and two "B" switches 131 and 132. These "A" and "B" switches, as is well understood in the art, operate as electrical interlocks and are mechanically controlled by the main circuit breaker operating mechanism. For example, the "A" switch will be closed when the main circuit breaker contacts are closed, and the "B" switch will be opened when the main circuit breaker contacts are closed and vice versa. In the diagram the movable contacts 17 of the main circuit breaker are shown as mounted upon the axis of the latching disc 47, and for simplicity the "A" switch 130 and the "B" switches 131 and 132 are shown as mounted upon this same axis and as operated by an oscillating arm 133. The diagram also shows the spring winding motor control switch 82 and the safety control switch 88 as operable by the disc 81, which is diagrammatically shown as located on the axis of the energy storing spring 53. In addition to the control switch 88, the diagram also shows an additional interlock switch 134 that is adapted to be automatically opened when the circuit breaker is controlled manually by the operation of a push button switch 135 and/or an operation of a push button switch 136.

Before describing an automatic opening and reclosing operation of the main circuit breaker, attention is directed to the control of the spring winding motor 71 that automatically operates to maintain a predetermined amount of stored energy in the operating spring 53 which moves the circuit breaker contacts 17, as has been previously described. As here illustrated, one side of the motor 71 is connected through a conductor 137 to a negative bus 138 of a control circuit from which the actuating current for the various electromagnetic devices is taken. The other side of the motor 71 is connected by a conductor 139 with one side of the switch 83, and extending from the other side of the switch 83 to a positive bus 140 of the control circuit there is a conductor 141. With this arrangement it will be seen that as the disc 81 is moved up and down by an unwinding or winding of the energy storing spring 53 as previously described, the switch 83 will be respectively closed and opened. As shown, the spring 53 is assumed to be fully wound, and as a result, the switch control disc 81 is in its lowermost position, where it is operating to hold the motor control switch 83 in its open position. Should the main circuit breaker operate and take energy from the spring 53, the switch control disc 81 will move upwardly, and after a predetermined amount of energy has been dissipated by the spring 53, the motor control switch 83 will again close and connect the spring winding motor 71 with the buses 138 and 140, and as a result, the spring 53 will be wound up until the switch control disc 81 is again moved down sufficiently far to open the motor control switch 83, as shown. It is to be understood that this action will occur and reoccur in an automatic manner, independently of the other control features of the circuit breaker.

An operation of the circuit breaker from its closed position, as shown, into its opened circuit position and through a single reclosing operation will now be described.

When the main circuit breaker contacts 16 and 17 are in their closed circuit position, as shown, it will be seen that should an overload occur upon the main line, designated by the numeral 142, the current transformer 128 will respond to this overload and cause the overload relay 127 to operate. This operation of the overload relay 127 will close its contact 143 and establish a circuit from the negative bus 138, which can be traced through a conductor 144 to the overload relay 127 and through conductors 145 and 146 to the tripping magnet 104 of the circuit breaker latching mechanism 46 and back through a conductor 147 through the "A" switch 130 and along the conductor 148 to the positive control bus 140. When this circuit is established, the tripping magnet 104 will move the latch 115 out of engagement with the spring pressed plunger 100, and as a result, the latch 92 will be tripped to release the latching disc 47 of the rotatable member 35 and permit the spring 53 to move the contacts 17 of the circuit breaker into their open circuit position. At the end of this operation it will be understood that the latch 94 will engage the latching disc 47 and hold the contacts 17 of the circuit breaker in their open circuit position until the timing relay 129 has operated to produce a reclosing of the circuit breaker. When the circuit breaker contacts 17 move into their open position, as just described, the lever 133, which is diagrammatically shown as operating the "A" and "B" switches, will cause the "A" switch 130 to open and at the same time the "B" switches 131 and 132 will be closed. At this point a circuit will be established from the positive control bus 140 through the conductor 148 to one side of an operating winding 149 of the timing relay 129, and the other side of the relay winding 149 will be connected through the "B" switch 131 and conductors 150 and 151 with the safety interlock switch 87 that is responsive to the condition of the energy storing spring 53, and from the other side of this switch 87, the timing motor circuit will be completed by a conductor 152 to the interlock switch 134 and from this point through conductor 153 to the negative control bus 138. As a result of this circuit connection to its operating winding 149, the timing relay 129 will be rendered operative, and after a predetermined lapse of time, as determined by the setting of this relay, its contact 154 will be closed and a circuit will be established from the negative bus 138 through a conductor 155, the closed contacts 154 of the timing relay 129 and a conductor 156 to one side of the reclosing trip electromagnet 105 of the main circuit breaker latching mechanism 46. The other side of the electromagnet 105 will then be connected through the "B" switch 132 by the conductors 157 and 148 and back to the positive control bus 140. This will cause the latch 115, associated with the reclosing trip electromagnet 105, to release the spring pressed bar 102, and thus trip the latch 94 and permit the spring 53 to return the circuit breaker contacts 17 to their closed circuit position. Now, if the overload or short circuit condition is removed from the main line during the described opening of the circuit breaker, its contacts 17 will remain in their closed circuit condition. However, should it happen upon this reclosing of the circuit breaker that the short circuit or overload condition is still present on the main line 142, the overload relay 127 will again operate, as previously described, and the latch tripping electromagnet 104 will be energized to again release the latch 92 of the latching mechanism 46 and permit the circuit breaker to open. This opening of the circuit breaker will close the "B" switch 131, and as a result, the timing relay 129 will again come into operation, and after a predetermined lapse of time it will again energize the latch tripping electromagnet 105 to permit another reclosing of the circuit breaker. At this point it may be said that the timing relay 129 will have a plurality of adjustable operating points which will permit a predetermined number of reclosing operations, after which it will become inoperative when the main line circuit breaker contacts 17 are in their open circuit position.

In addition to the above automatic control of the circuit breaker, provision is also made for a manual push button control thereof by an operator at the circuit breaker. This manual control is accomplished by means of the aforementioned push buttons 135 and 136.

Before describing the manual operation of the circuit breaker, it should be stated that the interlock switch 134 will automatically open when the button 136 is operated and will close again when the button 135 is operated. This will prevent an automatic reclosing of the circuit breaker should it be opened manually by an operation of the push button 136. Under these conditions, with the breaker contacts 17 in their closed circuit position, it will be seen that when the push button 136 is pressed in, a circuit will be established from the negative bus 138 through a conductor 158 and a conductor 146 to the latch tripping electromagnet 104 and back via the conductor 147, to the "A" switch 130 and through conductor 148 to the positive control bus 140. In this instance, as has been previously described, the interlocking switch 134 will be open, due to the manual control, and as a result, the operating winding 149 of the timing relay 129 will be deenergized. This will prevent an automatic reclosing of the circuit breaker. If it is now desired to manually close the circuit breaker, the operator will, by operating the closing pushbutton 135, establish a circuit from the negative bus 138 through the conductors 158 and 156 to the tripping electromagnet 105 of the circuit breaker latching mechanism and back through the conductor 157, the "B" switch 132 and the conductor 148 to the positive control bus 140. The tripping of the latch 94 in this manner will permit the energy storing spring 53 to move the circuit breaker contacts into their closed circuit position.

While I have, for the sake of clearness and in order to disclose the invention so that the same can be readily understood, described and illustrated specific devices and arrangements, I desire to have it understood that this invention is not limited to the specific means disclosed, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is—

1. In an automatic reclosing circuit breaker, the combination of spaced stationary contacts, a movable contact bridging member adapted to form a closed circuit between said stationary contacts, an oscillating shaft for moving said contact bridging member into and out of bridging relation with said stationary contacts, a second shaft disposed at a right angle to said oscillating shaft and adapted to rotate in one direction only, a power supplying means for driving said second shaft through a plurality of revolutions in one direction, a driving connection between said oscillating and said second shaft adapted to produce a forward and a reverse movement of said oscillating shaft during each complete revolution of said second shaft, two latch abutments carried by said oscillating shaft, a latch means cooperating with each of the abutments upon said oscillating shaft for latching same at the end of each oscillation thereof, a current responsive latch tripping means adapted to render one of said latch means inoperative to permit a movement of the oscillating shaft in one direction to move said contact bridging member into its open circuit position, and a second current responsive latch tripping means for rendering the other of said latch means inoperative to permit a reverse movement of the oscillating shaft to move said contact bridging member into its circuit closed position, said first and second current responsive latch tripping means being adapted by successive operations thereof to produce a series of circuit opening and reclosing operations of the circuit breaker.

2. In an automatic reclosing circuit breaker, the combination of spaced stationary contacts, a movable contact bridging member adapted to form a closed circuit between said stationary contacts, an oscillating shaft for moving said contact bridging member into and out of bridging relation with said stationary contacts, a second shaft disposed at a right angle to said oscillating shaft and adapted to rotate in one direction only, an energy storing spring for driving said second shaft through a plurality of revolutions, a driving connection between said oscillating and said second shaft adapted to produce a 90 degree forward and a 90 degree reverse movement of said oscillating shaft during each complete revolution of said second shaft, two latch abutments carried by said oscillating shaft, a latch means cooperating with each of the abutments upon said oscillating shaft for latching same at the end of each oscillation thereof, a current responsive latch tripping means adapted to render one of said latch means inoperative to permit a movement of the oscillating shaft in one direction to move said contact bridging member into its open circuit position, and a second current responsive latch tripping means for rendering the other of said latch means inoperative to permit a reverse movement of the oscillating shaft to move said contact bridging member into its circuit closed position, said first and second current responsive latch tripping means being adapted when successively energized to produce a series of circuit opening and reclosing operations of the circuit breaker.

3. In an automatic reclosing circuit breaker, the combination of spaced stationary contacts, a movable contact bridging member adapted to form a closed circuit between said stationary contacts, an oscillating shaft for moving said contact bridging member into and out of bridging relation with said stationary contacts, a second shaft adapted to rotate in one direction and disposed at a right angle to said oscillating shaft, an energy storing spring for driving said second shaft through a plurality of revolutions, a universal link connection between said oscillating shaft and said second shaft adapted to produce a forward and a reverse movement of said oscillating shaft during each complete revolution of said second shaft, independent stop means cooperating with said oscillating shaft for holding same stationary at the end of each oscillation thereof and operating through said universal link to prevent rotation of said second shaft by said energy storing spring, and means adapted to alternately render said stop means inoperative and permit said movements of said oscillating shaft first in one direction and then in the other direction, whereby the circuit breaker contact bridging member will be operated through a series of circuit opening and reclosing operations as said second shaft is rotated by said energy storing spring.

4. In an automatic reclosing circuit breaker, the combination of spaced stationary contacts, a movable contact bridging member adapted to form a closed circuit between said stationary contacts, an oscillating shaft for moving said contact bridging member into and out of bridging relation with said stationary contacts, a second shaft adapted to rotate in one direction and disposed at a right angle to said oscillating shaft, an energy storing spring for driving said second shaft through a plurality of revolutions, a universal link connection between said oscillating shaft and said second shaft adapted to produce a 90 degree forward and a 90 degree reverse movement of said oscillating shaft during each complete revolution of said second shaft, stop means cooperating with said oscillating shaft for holding same stationary at the end of each 90 degree oscillation thereof and operating through said universal link to prevent rotation of said second shaft by said energy storing spring, and means adapted to render said stop means inoperative and permit a 90 degree movement of the oscillating shaft in one direction to operate said movable contact bridging member into its open circuit position with respect to the stationary contacts and a subsequent 90 degree movement in another direction to operate said movable contact bridging member into its closed circuit position, whereby the circuit breaker will be operated through a series of circuit reclosing and opening operations as said second shaft is rotated in one direction by said energy storing spring.

5. In an automatic reclosing circuit breaker, the combination of spaced stationary contacts, a rotatable contact bridging member adapted to form a closed circuit between said stationary contacts, an oscillating shaft for rotating said contact bridging member into and out of bridging relation with said stationary contacts, a second shaft adapted to rotate in a unidirectional manner disposed at a right angle to said oscillating shaft, an energy storing spring for driving said second shaft through a plurality of revolutions, an articulated driving connection between said oscillating shaft and said second shaft adapted to produce a 90 degree forward and reverse movement of said oscillating shaft during each complete revolution of said second shaft, a stop plate secured upon said oscillating shaft having oppositely disposed latch surfaces movable through an arc of 90 degrees, independent latch means cooperating with the latch surfaces of said stop plate for holding said oscillating shaft stationary at the end of each 90 degree oscillation thereof, and means adapted to render said latch means inoperative and permit said 90 degree movements of said oscillating shaft, whereby the circuit breaker will be operated through a plurality of circuit opening and reclosing operations as said second shaft is rotated unidirectionally by said energy storing spring.

6. In an automatic reclosing circuit breaker, the combination of spaced stationary contacts, a contact bridging member adapted to form a closed circuit between said stationary contacts, an oscillating shaft for moving said contact bridging member into and out of bridging relation with said stationary contacts, a second shaft adapted to rotate in a unidirectional manner disposed at a right angle at one end of said oscillating shaft, an energy storing spring for driving said second shaft through a plurality of revolutions, an articulated driving connection between the ends of said oscillating shaft and said second shaft adapted to produce a forward and reverse movement of said oscillating shaft during each complete revolution of said second shaft, a stop plate secured upon said oscillating shaft having oppositely disposed latch surfaces, latch means cooperating with each of the latch surfaces of said stop plate for holding said oscillating shaft stationary at the end of each oscillation thereof, and means for successively rendering said latch means inoperative and permitting a forward and reverse movement of said oscillating shaft, whereby the circuit breaker will be operated by said oscillating shaft through a plurality of circuit opening and reclosing operations as said second shaft is driven in a unidirectional manner by said energy storing spring.

7. In an automatic reclosing circuit breaker, the combination of spaced stationary contacts, a movable contact bridging member adapted to form a closed circuit between said stationary contacts, an oscillating shaft for moving said contact bridging member into and out of bridging relation with said stationary contacts, a second shaft disposed at a right angle to said oscillating shaft and adapted to rotate in one direction only, an energy storing spring for driving said second shaft through a plurality of revolutions, a driving connection between said oscillating and said second shaft adapted to produce a forward and a reverse movement of said oscillating shaft during each complete revolution of said second shaft, two latch abutments carried by said oscillating shaft, a latch means cooperating with each of the abutments upon said oscillating shaft for latching same at the end of each oscillation thereof, a spring operated latch tripping means adapted to render one of said latch means inoperative to permit a movement of the oscillating shaft in one direction to move said contact bridging member into its open circuit position, a second spring operated latch tripping means for rendering the other of said latch means inoperative to permit a reverse movement of the oscillating shaft to move said contact bridging member into its circuit closed position, electromagnetic means for releasing said spring operated latch tripping means, and means carried by said oscillating shaft for resetting each of said spring operated latch tripping means as the oscillating shaft moves following a release thereof by said spring operated latch tripping means.

8. In an automatic reclosing circuit breaker, the combination of spaced stationary contacts, a movable contact bridging member adapted to form a closed circuit between said stationary contacts, an oscillating shaft for moving said contact bridging member into and out of bridging relation with said stationary contacts, a second shaft disposed at a right angle to said oscillating shaft and adapted to rotate in one direction only, an energy storing spring for driving said second shaft through a plurality of revolutions, a driving connection between said oscillating and said second shaft adapted to produce a 90 degree forward and a 90 degree reverse movement of said oscillating shaft during each complete revolution of said second shaft, two opposed latch abutments carried by said oscillating shaft disposed 90 degrees apart, a latch means cooperating with each of the abutments upon said oscillating shaft for holding same stationary at the end of each 90 degree oscillation thereof, a mechanically operating latch tripping means adapted to render one of said latch means inoperative to permit a 90 degree movement of the oscillating shaft in one direction to move said contact bridging member into its open circuit position, a second mechanically operated latch tripping means for rendering the other of said latches inoperative to permit a 90 degree reverse movement of the oscillating shaft to move said contact bridging member into its circuit closed position, electromagnetic means for controlling the operation of said mechanically operating latch tripping means, and means operated by the movement of said oscillating shaft to reset said mechanically operating latch tripping means as said oscillating shaft moves following each release thereof by said latch means.

9. In an automatic circuit breaker of the character described, the combination of a power shaft, an energy storing spring connected to said power shaft and adapted to rotate same in a unidirectional manner, a switch operating shaft extending at a right angle to the axis of said power shaft, a driving connection between the ends of said power shaft and said switch operating shaft adapted to impart an oscillating movement to said switch operating shaft as said power shaft is rotated by said energy storing spring, said driving connection being such that during each 180 degree rotation of said power shaft the driving force exerted by said power shaft upon said switch operating shaft will vary from substantially zero to a maximum and back to substantially zero, and a loading means associated with said power shaft adapted to impose an artificial load thereupon during the periods of substantially zero power transmission to said switch operating shaft, whereby a substantially uniform load will be imposed upon said energy storing spring throughout a complete rotation of said power shaft.

10. In an automatic circuit breaker of the character described, the combination of a power shaft, an energy storing spring connected to said power shaft and adapted to rotate same in a unidirectional manner, a crank fixed upon the end of said power shaft, a switch operating shaft extending at a right angle to the axis of said power shaft, a crank upon said switch operating shaft, a driving connection between the ends of the cranks upon said power shaft and upon said switch operating shaft adapted to impart an oscillating movement to said switch operating shaft as said power shaft is rotated by said energy storing spring, the disposition of said crank arms and said universal link being such that during each 180 degree rotation of said power shaft the driving force exerted by said power shaft upon said switch operating shaft will vary from substantially zero to a maximum and back to substantially zero, and a loading means associated with said power shaft adapted to impose an artificial load thereupon during the periods of substantially zero power transmission to said switch operating shaft, whereby a substantially uniform load will be imposed upon said energy storing spring throughout a complete rotation of said power shaft.

11. In an automatic circuit breaker of the character described, the combination of a power shaft, an energy storing spring connected to said power shaft and adapted to drive same in a unidirectional manner, a crank fixed upon the end of said power shaft movable in a plane transverse to the axis thereof, a switch operating shaft extending at a right angle to the axis of said power shaft, a crank upon said switch operating shaft movable in a plane located on the axis of said power shaft, a universal link connection between the ends of the cranks upon said power shaft and upon said switch operating shaft adapted to impart an oscillating movement to said switch operating shaft as said power shaft is rotated by said energy storing spring, the disposition of said crank arms and said universal link being such that during each 180 degree rotation of said power shaft the driving force exerted by said power shaft upon said switch operating shaft will vary from substantially zero to a maximum and back to substantially zero, and a loading means associated with said power shaft adapted to impose an artificial load thereupon during the periods of substantially zero power transmission to said switch operating shaft, whereby a substantially uniform load will be imposed upon said energy storing spring throughout a complete rotation of said power shaft.

12. In an automatic reclosing circuit breaker of the character described, the combination of circuit controlling contacts adapted to be moved into and out of contact with each other, an oscillating shaft adapted to control said contacts, driving means for said shaft adapted to impart an oscillating movement thereto, a radially disposed abutment carried by said switch operating shaft, a latch adapted to cooperate with said radially disposed abutment and hold said shaft at the end of an oscillating movement thereof, a latch releasing striker adapted to release said latch and permit said shaft to move from its latched position and operate the circuit controlling contacts, a spring means for actuating said latch releasing striker, and means carried by said switch operating shaft adapted upon movement of said shaft after its release by said latch to immediately compress said latter spring means and reset said striker for a subsequent operation thereof.

13. In an automatic circuit breaker of the character described, the combination of a switch operating shaft, a power applying means connected to said shaft adapted to produce a partial rotation thereof, a latch accommodating cam having a latching abutment extending radially therefrom, a latch biased into an operative position by a spring and adapted to cooperate with said radially disposed abutment, whereby said shaft will be latched to prevent said partial rotation, a spring operated latch tripping means associated with said latch for rendering same inoperative under predetermined conditions to permit a release of said shaft from its latched position, electromagnetic means for releasing said spring operated latch tripping means in response to a predetermined condition upon the circuit controlled by the circuit breaker, and means carried by said shaft adapted upon said partial rotation of said shaft to reset said spring operated striker means after a release thereof by said electromagnetic means.

14. In an automatic circuit breaker of the character described, the combination of a switch operating shaft, a power applying means connected to said shaft adapted to produce an oscillating movement thereof, a latch accommodating cam having latching abutments extending radially from said cam and at a right angle to each other, a latch at each side of said switch operating shaft biased into an operative position by a spring and adapted to cooperate with one or the other of said radially extending abutments, whereby said oscillating shaft will be latched at the end of each oscillation thereof, a spring operated latch tripping means associated with each of said latches for rendering same inoperative under predetermined conditions to permit a movement of said shaft from its latched position, electromagnetic means for releasing said spring operated latch tripping means in response to predetermined conditions upon the circuit controlled by the circuit breaker, and means operated by movement of said oscillating shaft for resetting said spring operated tripping means after each release thereof by said electromagnetic means.

15. In a reclosing circuit breaker of the character described, the combination of circuit interrupting means comprising relatively movable contacts, a mechanism for operating said contacts between their open and closed circuit positions, a normally wound energy storing spring connected to and adapted to supply sufficient operating energy for a plurality of operations of said mechanism, an electric motor for winding said spring, a switch for controlling the operation of said electric motor, and a switch operating means differentially connected between the ends of said spring for operating said switch, whereby said electric motor will maintain a predetermined wound condition in said spring as determined by the angular displacement of the ends thereof.

16. In a reclosing circuit breaker of the character described, the combination of circuit interrupting means comprising relatively movable contacts, a mechanism for operating said contacts between their open and closed circuit positions, a normally wound energy storing spring connected to and adapted to supply sufficient operating energy for a plurality of operations of said mechanism, an electric motor for winding said spring, means responsive to the wound condition of said spring for controlling said motor to maintain a predetermined wound condition in said spring, means for controlling the operation of said mechanism for operating said contacts, and a second means responsive to the unwound condition of said spring adapted to prevent an operation of said mechanism to effect a reclosing of the circuit breaker when the wound condition of said spring is below a predetermined value.

17. In an automatic circuit breaker, the combination of stationary contacts, a movable contact engaging member adapted to establish a circuit between said stationary contacts, an operating shaft for controlling the operation of said movable contact engaging member, a cylindrical energy storing spring connected at one end to said operating shaft and having its other end mounted to turn independently of said shaft, a motor operated winding means connected to the latter end of said spring, a ring gear movable with said operating shaft, a second ring gear attached to and movable with the free end of said energy storing spring, an internally threaded element adapted to be rotated by said first ring gear as said operating shaft moves to control the operation of said movable contact engaging member, a threaded member extending into said internally threaded element adapted to move axially thereof in the event of relative movement therebetween, a gear adapted to be rotated by said second ring gear adapted to rotate said threaded member and permit axial movement thereof as the free end of said energy storing spring moves relatively to its other end, whereby said threaded member will move axially of said internally threaded element as said energy storing spring is being wound-up by said electric motor and unwinds to rotate said operating shaft, a control switch for said electric motor, and means connected to said threaded member for controlling the operation of said switch, whereby said motor will be energized when the energy storing spring has given up a predetermined amount of its stored energy and stopped when said energy storing spring has been wound sufficiently to store-up a predetermined amount of energy.

AUGUST C. SCHWAGER.